US012768452B2

(12) United States Patent
He et al.

(10) Patent No.: US 12,768,452 B2
(45) Date of Patent: Oct. 20, 2026

(54) VALVE NEEDLE COMPONENT AND FLOW REGULATING VALVE

(71) Applicant: Zhejiang Dunan Artificial Environment Co., Ltd., Shaoxing (CN)

(72) Inventors: Yuchen He, Shaoxing (CN); Leqiang Liu, Shaoxing (CN); Yonghao Chen, Shaoxing (CN); Guanjun Xu, Shaoxing (CN)

(73) Assignee: Zhejiang Dunan Artificial Environment Co., Ltd., Shaoxing (CN)

(*) Notice: Subject to any disclaimer, the term of this patent is extended or adjusted under 35 U.S.C. 154(b) by 96 days.

(21) Appl. No.: 18/703,340

(22) PCT Filed: Oct. 12, 2022

(86) PCT No.: PCT/CN2022/124930

§ 371 (c)(1),
(2) Date: Apr. 20, 2024

(87) PCT Pub. No.: WO2023/066116

PCT Pub. Date: Apr. 27, 2023

(65) Prior Publication Data

US 2024/0418268 A1 Dec. 19, 2024

(30) Foreign Application Priority Data

Oct. 20, 2021 (CN) ......................... 202122531063.8
Oct. 20, 2021 (CN) ......................... 202122545371.6

(51) Int. Cl.
*F16K 1/04* (2006.01)
*F16K 1/38* (2006.01)
*F16K 1/48* (2006.01)

(52) U.S. Cl.
CPC ................ *F16K 1/04* (2013.01); *F16K 1/385* (2013.01); *F16K 1/48* (2013.01)

(58) Field of Classification Search
CPC ... F16K 1/04; F16K 1/385; F16K 1/48; F16K 1/487; F16K 1/36; F16K 27/02; F25B 41/31; Y02B 30/70
See application file for complete search history.

(56) References Cited

U.S. PATENT DOCUMENTS 3,294,359 A * 12/1966 Bauer ................ B23Q 11/1084 285/276
5,419,531 A * 5/1995 Hoehn ...................... F16K 1/38 251/903

(Continued)

FOREIGN PATENT DOCUMENTS

CN 102042415 5/2011
CN 107366772 11/2017

(Continued)

OTHER PUBLICATIONS

Original Document with Machine translation (English) of JP 2017203508 A; (Year: 2017).*

(Continued)

*Primary Examiner* — Craig M Schneider
*Assistant Examiner* — Andrew J Rost
(74) *Attorney, Agent, or Firm* — The Sun IP Law

(57) ABSTRACT

Provided in the present invention are a valve needle component and a flow regulating valve. The valve needle component includes: a screw, wherein the screw comprises a first rod section, a second rod section and a third rod section which are connected in sequence, the outer diameter of the first rod section is greater than the outer diameter of the second rod section, and the outer diameter of the second rod section is greater than the outer diameter of the third rod section; a bearing sleeved on the second rod section; and a bushing sleeved on the third rod section, wherein the bushing is welded to the third rod section, and two end surfaces (Continued)

of an inner ring of the bearing respectively abut against an end surface of the first rod section and an end surface of the bushing.

11 Claims, 3 Drawing Sheets

(56) References Cited

U.S. PATENT DOCUMENTS

| | | | | |
|---|---|---|---|---|
| 2012/0235069 | A1* | 9/2012 | Richardson | F16K 1/487<br>251/366 |
| 2015/0121951 | A1* | 5/2015 | Zhan | F16K 3/265<br>251/129.01 |
| 2019/0368618 | A1* | 12/2019 | Wei | F16K 1/52 |
| 2021/0041028 | A1* | 2/2021 | Tang | F16K 1/48 |

FOREIGN PATENT DOCUMENTS

| | | | |
|---|---|---|---|
| CN | 210920163 | | 7/2020 |
| CN | 112178223 | | 1/2021 |
| CN | 112621164 | | 4/2021 |
| CN | 216200583 | U | 4/2022 |
| CN | 216200585 | U | 4/2022 |
| CN | 216200589 | U | 4/2022 |
| JP | H102450 | A | 1/1998 |
| JP | 2001324043 | | 11/2001 |
| JP | 2017203508 | A | 11/2017 |
| JP | 2019219007 | A | 12/2019 |
| KR | 20210000190 | U | 1/2021 |

OTHER PUBLICATIONS

Original Document with Machine translation (English) of CN 112178223 A (Year: 2020).*

The first office action of counterpart JP application No. 2024520549 issued on May 19, 2025.

The first office action of counterpart EP application No. 22882726.7 issued on Dec. 20, 2024.

The first office action of counterpart KR application No. 10-2024-7016144 issued on Jun. 17, 2026.

* cited by examiner

VALVE NEEDLE COMPONENT AND FLOW REGULATING VALVE

CROSS-REFERENCE TO RELATED APPLICATION

This disclosure claims priority to Chinese Patent Application No. 202122545371.6 filed to the China National Intellectual Property Administration on Oct. 20, 2021 and entitled "Valve Needle Component and Flow Regulating Valve".

This disclosure claims priority to Chinese Patent Application No. 202122531063.8 filed to the China National Intellectual Property Administration on Oct. 20, 2021 and entitled "Valve Needle Structure and Electronic Expansion Valve with The Same".

TECHNICAL FIELD

The present invention relates to the technical field of flow regulating valves, specifically to a valve needle component and a flow regulating valve.

BACKGROUND

At present, for a valve needle component and a flow regulating valve such as an electronic expansion valve in a prior art, usually, a bearing is mounted in a screw first, and then, the bearing is limited in an axial direction by flanging according to a method of forming a flanging hole inside the screw.

By using a flanging structure on the screw to limit the bearing, the stress on the flanging hole increases during a flanging process, which may easily lead to an increase in stress on an inner ring of the bearing. As a result, an inner retainer of the bearing is deformed, the bearing is stuck when rotating, and a friction force when the bearing rotates is increased, thus affecting the valve opening performance and the service life of products.

SUMMARY

The present invention provides a valve needle component and a flow regulating valve to solve the problem of relatively large stress on an inner ring of a bearing in a valve needle component in the prior art.

To solve the above problem, according to one aspect of the present invention, a valve needle component is provided. The valve needle component comprises: a screw, wherein the screw comprises a first rod section, a second rod section and a third rod section which are connected in sequence, an outer diameter of the first rod section is greater than an outer diameter of the second rod section, and the outer diameter of the second rod section is greater than an outer diameter of the third rod section; a bearing sleeved on the second rod section; and a bushing sleeved on the third rod section, wherein the bushing is welded to the third rod section, and two end surfaces of an inner ring of the bearing respectively abut against an end surface of the first rod section and an end surface of the bushing.

In some embodiments, in an axial direction of the screw, a length of the second rod section is M, a length of the inner ring is N, and M<N.

In some embodiments, M≥N/2.

In some embodiments, an inner diameter of the bushing is greater than the outer diameter of the third rod section, or an inner diameter of the bushing is equal to the outer diameter of the third rod section, or an inner diameter of the bushing is less than the outer diameter of the third rod section.

In some embodiments, an outer diameter of the bushing and the outer diameter of the first rod section are both less than an inner diameter of an outer ring of the bearing.

In some embodiments, the valve needle component further comprises: a valve head, wherein the valve head has an assembly cavity, and the bearing is located in the assembly cavity.

In some embodiments, the valve needle component further comprises: a limiting seat arranged in the assembly cavity, wherein the bushing and the third rod section are both located in a cavity of the limiting seat, and the limiting seat abuts against an outer ring of the bearing; and an elastic element which is arranged in the assembly cavity, wherein a first end of the elastic element abuts against the limiting seat, and a second end of the elastic element abuts against a bottom wall of the assembly cavity.

In some embodiments, the limiting seat comprises a limiting sleeve and a limiting boss arranged at an end of the limiting sleeve, the bearing and the third rod section are both located in the limiting sleeve, the limiting sleeve abuts against the outer ring of the bearing, the elastic element is a spring, and the limiting boss penetrates into the elastic element.

According to another aspect of the present invention, a flow regulating valve is provided. The flow regulating valve comprises the above valve needle component.

In some embodiments, the screw of the valve needle component further comprises a fourth rod section, the fourth rod section is connected with the first rod section, and the fourth rod section has external threads; the flow regulating valve further comprises a nut structure, and the nut structure has internal threads; and the internal threads are in cooperation with the external threads.

In some embodiments, the flow regulating valve is an electronic expansion valve.

By the technical solution in the present invention, a valve needle component is provided. The valve needle component includes: a screw, wherein the screw comprises a first rod section, a second rod section and a third rod section which are connected in sequence, an outer diameter of the first rod section is greater than an outer diameter of the second rod section, and the outer diameter of the second rod section is greater than an outer diameter of the third rod section; a bearing sleeved on the second rod section; and a bushing sleeved on the third rod section, wherein the bushing is welded to the third rod section, and two end surfaces of an inner ring of the bearing respectively abut against an end surface of the first rod section and an end surface of the bushing. By this solution, the rod sections with outer diameters from large to small on the screw are the first rod section, the second rod section and the third rod section in sequence. The second rod section is a mounting section of the bearing, which is in clearance fit, transition fit or interference fit with the inner ring of the bearing, the inner ring abuts against a step formed between the first rod section and the second rod section, the third rod section is a mounting section of the bushing, which is in clearance fit, transition fit or interference fit with an inner hole of the bushing, one end of the bushing abuts against the inner ring of the bearing, and the bushing and the screw are fixed as a whole by welding, thereby limiting an axial direction of the inner ring of the bearing. This structure avoids the problems of an inner retainer of the bearing being deformed due to relatively large stress on the inner ring of the bearing, and the bearing being stuck when the bearing rotates when the bearing is mounted on the screw of the valve needle component in an existing flow regulating valve, and the friction force when the bearing rotates is reduced, such that the product performance is improved.

BRIEF DESCRIPTION OF THE DRAWINGS

The accompanying drawings of the specification, constituting a part of the present invention, are used for providing a further understanding of the present invention. The exemplary embodiments of the present invention and the descriptions thereof are used for explaining the present invention, and do not constitute an improper limitation on the present invention. In the accompanying drawings.

Figure 1:
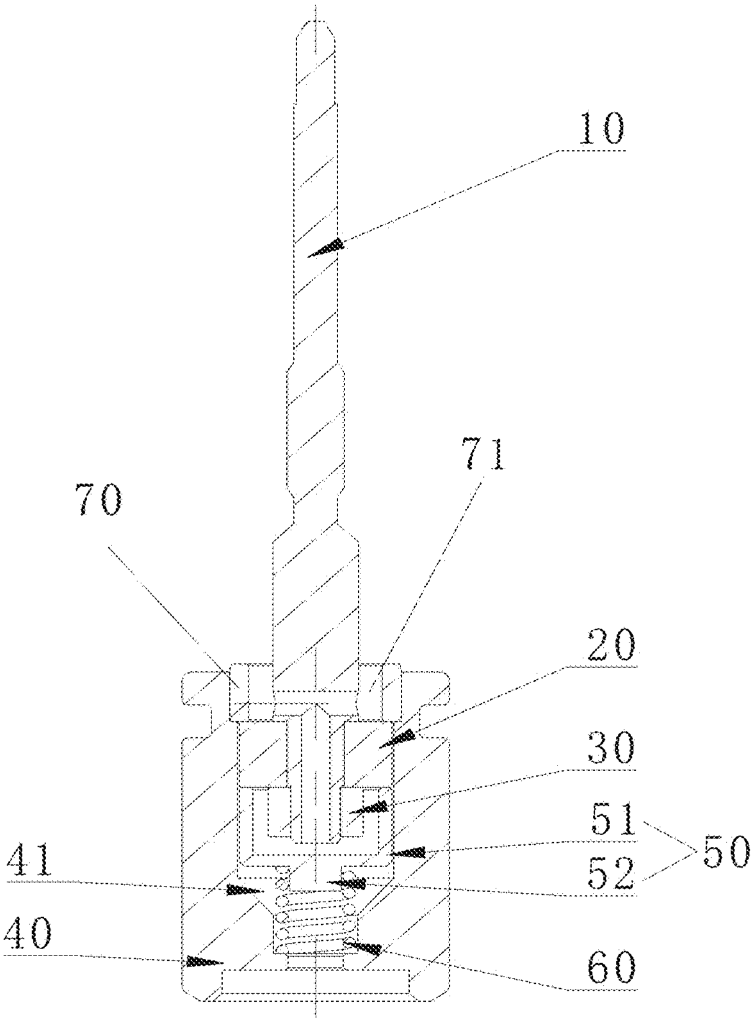
FIG. 1 shows a schematic structural diagram of a valve needle component provided in an embodiment of the present invention.

The above accompanying drawings have the following reference numerals:

10. screw; 11. first rod section; 12. second rod section; 13. third rod section; 14. fourth rod section; 20. bearing; 30. bushing; 40. valve head; 41. assembly cavity; 411. first cavity section; 412. second cavity section; 413. step surface; 414. third cavity section; 415. transition section; 42. sealing end; 50. limiting seat; 51. limiting sleeve; 52. limiting boss; 60. elastic element; 70. pressing sleeve; 71. accommodating channel.

DETAILED DESCRIPTION OF THE EMBODIMENTS

The technical solution in the embodiments of the present invention is clearly and completely described below with reference to the accompanying drawings in the embodiments of the present invention. Apparently, the described embodiments are only some embodiments rather than all the embodiments of the present invention. The following description of at least one exemplary embodiment is only illustrative, and does not constitute any limitation on the present invention and the invention or use of the present invention. All other embodiments obtained by those of ordinary skill in the art based on the embodiments in the present invention without creative effort shall fall within the protection scope of the present invention.

Figure 3:
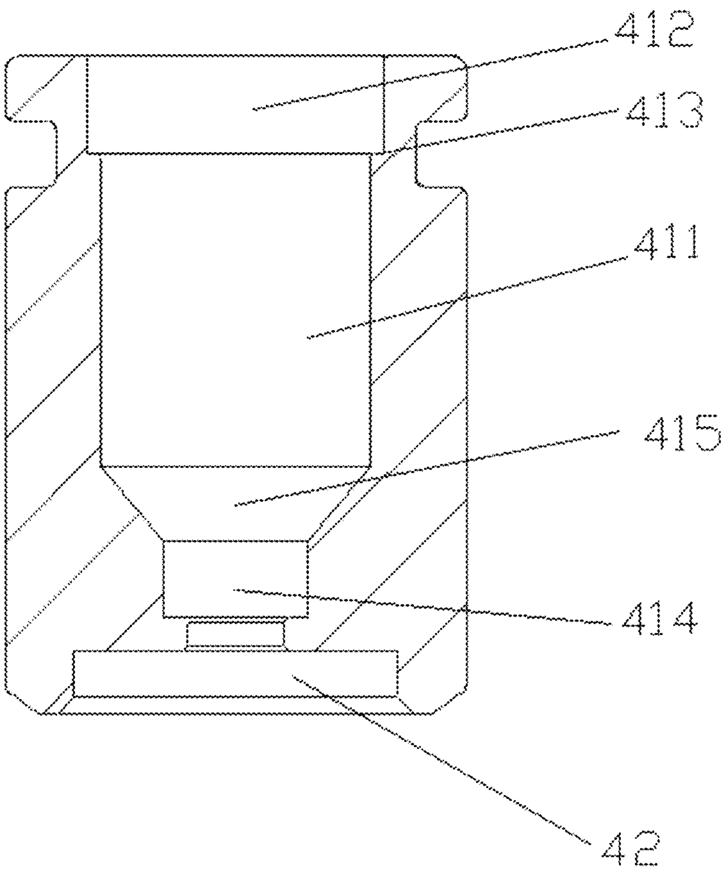
FIG. 3 shows a schematic diagram of a pressing sleeve in FIG. 1.

As shown in FIG. 1 and FIG. 3, an embodiment of the present invention provides a valve needle component, including: a screw 10, wherein the screw 10 includes a first rod section 11, a second rod section 12 and a third rod section 13 which are connected in sequence, an outer diameter of the first rod section 11 is greater than an outer diameter of the second rod section 12, and the outer diameter of the second rod section 12 is greater than an outer diameter of the third rod section 13; a bearing 20 sleeved on the second rod section 12; and a bushing 30 sleeved on the third rod section 13, wherein the bushing 30 is welded to the third rod section 13, and two end surfaces of an inner ring of the bearing 20 respectively abut against an end surface of the first rod section 11 and an end surface of the bushing 30. In some embodiments, the bearing 20 includes the inner ring, an outer ring, and steel balls and a retainer arranged between the inner ring and the outer ring.

In the present embodiment, the bearing 20 and the bushing 30 are arranged on the rod section of the screw 10. The rod sections with outer diameters from large to small on the screw 10 are the first rod section 11, the second rod section 12 and the third rod section 13 in sequence. The second rod section 12 is a mounting section of the bearing 20, which is in clearance fit, transition fit or interference fit with the inner ring of the bearing 20, the bearing 20 is sleeved on the second rod section 12, and a first end of the inner ring of the bearing 20 abuts against a step surface formed by the first rod section 11 and the second rod section 12. The third rod section 13 is a mounting section of the bushing 30, which is in clearance fit, transition fit or interference fit with an inner hole of the bushing 30, the bushing 30 is sleeved on the third rod section 13, an end surface of the bushing 30 abuts against a second end of the inner ring of the bearing 20, and the bushing 30 is welded to the third rod section 13, thereby limiting the bearing 20. This structure avoids the problems of the inner retainer of the bearing 20 being deformed due to relatively large stress on the inner ring of the bearing 20, and the bearing 20 being stuck when the bearing 20 rotates by adopting a flanging manner in the prior art, and the friction force when the bearing 20 rotates is reduced, such that the product performance is improved.

Figure 2:
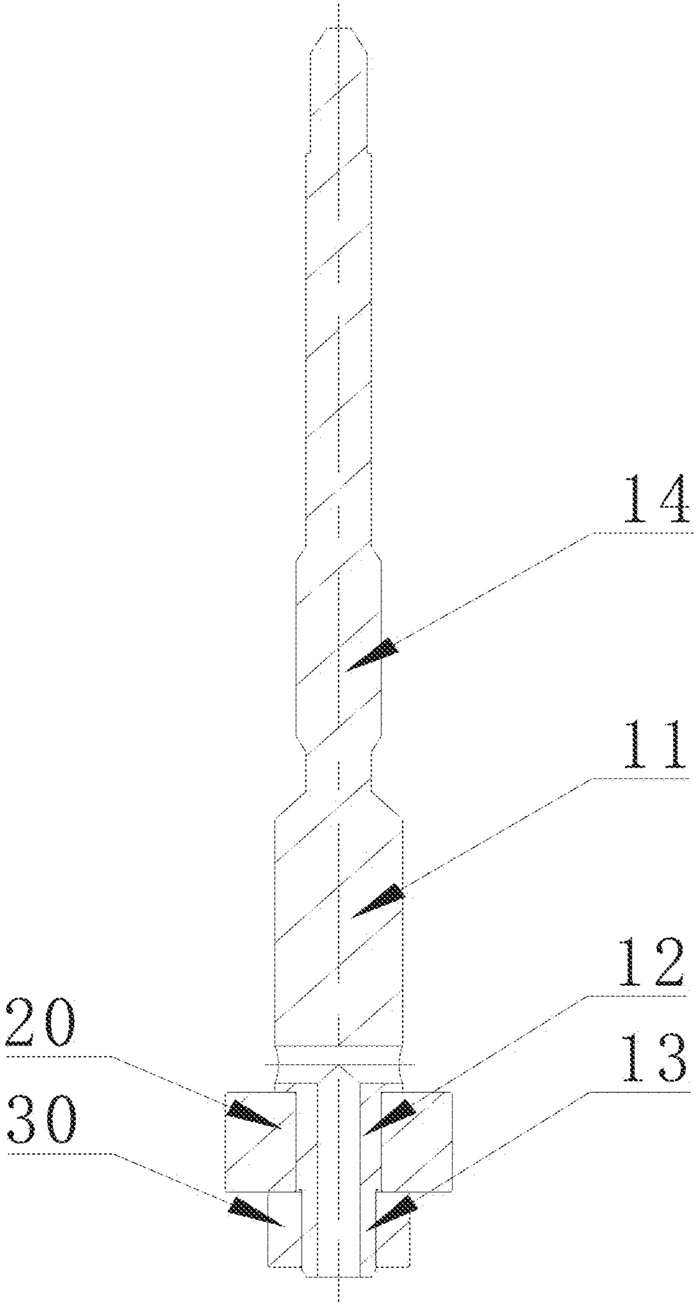
FIG. 2 shows a schematic diagram of partial structures in the valve needle component in FIG. 1.

As shown in FIG. 2, in an axial direction of the screw 10, a length of the second rod section 12 is M, a length of the inner ring is N, and M<N. The length of the inner ring of the bearing 20 is greater than the second rod section 12 to ensure that the first end of the inner ring of the bearing 20 abuts against the step surface formed by the first rod section 11 and the second rod section 12, and the second end of the inner ring of the bearing 20 slightly protrudes from the second rod section 12 to ensure that the second end of the inner ring of the bearing 20 abuts against the bushing 30. In this way, the inner ring of the bearing 20 is limited in two directions, thereby improving the assembly accuracy, and avoiding poor flow consistency of a flow regulating valve caused by axial shaking of the bearing 20.

In some embodiments, M≥N/2. That is, the second rod section 12 should not be too short to ensure that the bearing 20 is able to be stably sleeved on the second rod section 12, thereby avoiding unnecessary damage to the second rod section 12, the bearing 20 and the third rod section 13 during the operation of the valve needle component.

In the present embodiment, the length of the second rod section 12 is less than the length of the inner ring of the bearing 20 and is not less than ½ of the length of the inner ring of the bearing, that is, N>M≥N/2, thereby ensuring that the bushing 30 normally abuts against the bearing 20, and the bearing 20 is limited by the step surface and the bushing 30, which respectively abut against both ends of the bearing 20, to prevent an axial movement of the bearing 20 on the screw 10, thereby improving the valve opening performance of the product, prolonging the service life of the product, and improving the flow consistency.

In some embodiments, an inner diameter of the bushing 30 is greater than the outer diameter of the third rod section 13, or an inner diameter of the bushing 30 is equal to the outer diameter of the third rod section 13, or an inner diameter of the bushing 30 is less than the outer diameter of the third rod section 13. The relationship between the inner diameter of the bushing 30 and the outer diameter of the third rod section 13 is able to be adjusted according to actual situations to facilitate adjustment and assembly.

In some embodiments, an outer diameter of the bushing 30 and the outer diameter of the first rod section 11 are both less than an inner diameter of the outer ring of the bearing 20, and the outer diameter of the bushing 30 and the outer diameter of the first rod section 11 are both greater than ½ of an outer diameter of the inner ring of the bearing 20, thereby avoiding interference of the bushing 30 and the first rod section 11 with the outer ring of the bearing 20.

As shown in FIG. 1, the valve needle component further includes: a valve head 40, wherein the valve head 40 has an assembly cavity 41, and the bearing 20 is located in the assembly cavity 41. The valve head 40 is provided with the assembly cavity 41, and a movement of the valve head 40 is controlled by other structures of the valve needle components assembled in the assembly cavity 41. The structure is simple, and the occupied space is small.

In some embodiments, the valve needle component further includes: a limiting seat 50 which is arranged in the assembly cavity 41, wherein the bushing 30 and the third rod section 13 are both located in a cavity of the limiting seat 50, and the limiting seat 50 abuts against the outer ring of the bearing 20; and an elastic element 60 which is arranged in the assembly cavity 41, wherein a first end of the elastic element 60 abuts against the limiting seat 50, and a second end of the elastic element 60 abuts against a bottom wall of the assembly cavity 41. The outer ring of the bearing 20 is able to be limited in the axial direction by the limiting seat 50.

In the present embodiment, the bushing 30 and the third rod section 13 are located in the cavity of the limiting seat 50, the limiting seat 50 is arranged in the assembly cavity 41, and the elastic element 60 is also arranged in the assembly cavity 41. From the above content, it can be seen that in FIG. 1, components in the assembly cavity 41 are the elastic element 60, the limiting seat 50, the third rod section 13, the bushing 30 sleeved on the third rod section 13, the bearing 20 abutting against the bushing 30, and the second rod section 12 on which the bearing 20 is sleeved in sequence from bottom to top. Other structures of the valve needle component are arranged in the assembly cavity 41 of the valve head 40, thereby reducing a use of the overall space. Furthermore, the assembly cavity 41 is also able to play a certain role in limiting and guiding other structures in the axial direction.

In some embodiments, the limiting seat 50 includes a limiting sleeve 51 and a limiting boss 52 which is arranged at an end of the limiting sleeve 51, the bearing 20 and the third rod section 13 are both located in the limiting sleeve 51, the limiting sleeve 51 abuts against the outer ring of the bearing 20, the elastic element 60 is a spring, and the limiting boss 52 penetrates into the elastic element 60.

The limiting sleeve 51 has an annular columnar structure, a first end of the annular column abuts against the outer ring of the bearing 20, and a center of a second end of the annular column is connected with a convex limiting boss 52. The limiting boss 52 has a cylindrical structure, a first end of a cylindrical surface is connected with the limiting sleeve 51, and a second end of the cylindrical surface penetrates into the elastic element 60. In some embodiments, an end of the elastic element 60 abuts against the limiting seat 50, and it can also be understood that the end of the elastic element 60 abuts against the limiting sleeve 51. By the present embodiment, the limiting boss 52 arranged in the elastic element 60 plays a certain limiting and guiding role to ensure the smooth movement of the limiting seat 50 abutting against the elastic element 60, thereby ensuring that the bearing 20 abutting against the limiting seat 50 is also able to move smoothly. Furthermore, the bearing 20 and the third rod section 13 are both arranged in the limiting sleeve 51, thereby avoiding the structure interference and improving the compactness of the valve needle component.

In the present embodiment, the screw 10, the bearing 20 and the bushing 30 form a screw assembly, and the valve head 40 has a sealing end 42 for blocking a valve port. The valve needle component further includes: a pressing sleeve 70, wherein the pressing sleeve 70 is arranged at an end of the valve head 40 away from the sealing end 42; and an end of the pressing sleeve 70 close to the sealing end 42 abuts against the screw assembly to limit the screw assembly through the pressing sleeve 70.

By the above arrangement, at least a part of the screw 10 is arranged in the assembly cavity 41, the screw 10 is movably arranged relative to the valve head 40, the pressing sleeve 70 is arranged at the end of the valve head 40 away from the sealing end 42, and the bearing 20 is fixed from the end of the valve head 40 away from the sealing end 42. In this way, the bearing 20 is in limiting fit with the pressing sleeve 70 to drive the valve head 40 to move, and the sealing end 42 is not provided with a press fitting structure, thereby greatly reducing the influence on the sealing position at a bottom of the valve head (i.e. the sealing end 42) when the pressing sleeve 70 is assembled improving the sealing effect and the flow consistency, and solving the problem of leakage risk during blocking of the valve head in the prior art.

To make the mounting of the pressing sleeve 70 easier, in the present embodiment, the pressing sleeve 70 has a ring structure; and the pressing sleeve 70 is in interference fit with or welded to the valve head 40.

To achieve the mounting of the pressing sleeve 70, in the valve needle component of the present embodiment, the assembly cavity 41 includes a first cavity section 411 and a second cavity section 412; and along an extension direction of the valve head 40, a cross-sectional area of the second cavity section 412 is greater than a cross-sectional area of the first cavity section 411 to form a step surface 413 between the first cavity section 411 and the second cavity section 412, and the pressing sleeve 70 abuts against the step surface 413.

In the present embodiment, an accommodating channel 71 is formed in the pressing sleeve 70; and along the extension direction of the valve head 40, the cross-sectional area of the accommodating channel 71 is less than the cross-sectional area of the first cavity section 411 to form a limiting surface for abutting against the screw assembly between the pressing sleeve 70 and the first cavity section 411. In this way, the screw assembly is able to be stably limited. In some embodiments, the limiting surface of the pressing sleeve 70 is able to be configured to abut against the outer ring on a side of the bearing 20 away from the bushing 30; or a step surface is arranged on the screw 10, and the limiting surface of the pressing sleeve 70 abuts against the step surface on the screw 10. The two manners are able to achieve axial limiting of the screw assembly.

The assembly cavity 41 includes a third cavity section 414, and the elastic element 60 is inserted into the third cavity section 414. In this way, the mounting of the elastic element 60 is firmer.

The valve head 40 has a sealing end 42 for blocking the valve port; the assembly cavity 41 further includes a transition section 415, and the transition section 415 is arranged on a side of the third cavity section 414 away from the sealing end 42; and along a direction of the valve head 40 close to the sealing end 42, a cross-sectional area of the transition section 415 gradually decreases. This structure provides a buffering effect for the collision between the screw 10 and the valve head 40 during operation.

According to another embodiment of the present invention, a flow regulating valve is provided. The flow regulating valve includes the above valve needle component.

As shown in FIG. 2, the screw 10 of the valve needle component further includes a fourth rod section 14, the fourth rod section 14 is connected with the first rod section 11, and the fourth rod section 14 has external threads; the flow regulating valve further includes a nut structure, and the nut structure has internal threads; and the internal threads are in cooperation with the external threads. By a cooperation between the external threads of the fourth rod section 14 and the internal threads of the nut structure, the valve needle component is connected with the other parts of the flow regulating valve. The nut structure cannot rotate in a circumferential direction. When the screw 10 rotates, under a cooperative guide of the threads, the screw 10 moves in the axial direction to drive the valve head 40 to move, thereby achieving the opening and closing of the valve port. The elastic element 60 is able to provide buffering protection for the valve head 40 and achieve sealing between the valve head 40 and the valve port.

In some embodiments, the flow regulating valve is an electronic expansion valve. By the present embodiment, the screw 10 includes the first rod section 11, the second rod section 12 and the third rod section 13 which are connected in sequence, and the rod sections with outer diameters from large to small on the screw 10 are the first rod section 11, the second rod section 12 and the third rod section 13 in sequence. The second rod section 12 is the mounting section of the bearing 20, which is in clearance fit, transition fit or interference fit with the inner ring of the bearing 20, the inner ring abuts against the step formed between the first rod section 11 and the second rod section 12, the third rod section 13 is the mounting section of the bushing 30, which is in clearance fit, transition fit or interference fit with the inner hole of the bushing 30, the end of the bushing 30 abuts against the inner ring of the bearing 20, and the bushing 30 and the screw 10 can be fixed as a whole by welding. This structure avoids the problems of the inner retainer of the bearing 20 being deformed due to relatively large stress on the inner ring of the bearing 20 and the bearing 20 being stuck when the bearing 20 rotates when the bearing 20 is mounted on the screw of the valve needle component in an existing electronic expansion valve, and the friction force when the bearing 20 rotates is reduced, such that the product performance is improved.

The above embodiments are only some embodiments of the present invention and are not intended to limit the present invention. It will be apparent to those skilled in the art that various modifications and changes can be made in the present invention. Any modifications, equivalent replacements, improvements, and the like made within the spirit and principle of the present invention shall be included within the protection scope of the present invention.

What is claimed is:

1. A valve needle component, comprising:

a screw, wherein the screw comprises a first rod section, a second rod section and a third rod section which are connected in sequence, an outer diameter of the first rod section is greater than an outer diameter of the second rod section, and the outer diameter of the second rod section is greater than an outer diameter of the third rod section;

a bearing sleeved on the second rod section;

a bushing sleeved on the third rod section, wherein the bushing is welded to the third rod section, and two end surfaces of an inner ring of the bearing respectively abut against an end surface of the first rod section and an end surface of the bushing;

a valve head, wherein the valve head has an assembly cavity, and the bearing is located in the assembly cavity;

a limiting seat arranged in the assembly cavity, wherein the bushing and the third rod section are both located in a cavity of the limiting seat, and the limiting seat abuts against an outer ring of the bearing; and an elastic element arranged in the assembly cavity, wherein a first end of the elastic element abuts against the limiting seat, and a second end of the elastic element abuts against a bottom wall of the assembly cavity.

2. The valve needle component as claimed in claim 1, wherein in an axial direction of the screw, a length of the second rod section is M, a length of the inner ring is N, and $M<N$.

3. The valve needle component as claimed in claim 2, wherein $M \geq N/2$.

4. The valve needle component as claimed in claim 1, wherein an inner diameter of the bushing is greater than the outer diameter of the third rod section, or an inner diameter of the bushing is equal to the outer diameter of the third rod section, or an inner diameter of the bushing is less than the outer diameter of the third rod section.

5. The valve needle component as claimed in claim 1, wherein an outer diameter of the bushing and the outer diameter of the first rod section are both less than an inner diameter of an outer ring of the bearing.

6. The valve needle component as claimed in claim 1, wherein the limiting seat comprises a limiting sleeve and a limiting boss which is arranged at an end of the limiting sleeve, the bearing and the third rod section are both located in the limiting sleeve, the limiting sleeve abuts against the outer ring of the bearing, the elastic element is a spring, and the limiting boss penetrates into the elastic element.

7. The valve needle component as claimed in claim 1, wherein the assembly cavity comprises a third cavity section, and the elastic element is inserted into the third cavity section.

8. The valve needle component as claimed in claim 7, wherein the valve head has a sealing end for blocking a valve port; the assembly cavity further comprises a transition section, and the transition section is arranged on a side of the third cavity section away from the sealing end; and along a direction of the valve head close to the sealing end, a cross-sectional area of the transition section gradually decreases.

9. A valve needle component, comprising:

a screw, wherein the screw comprises a first rod section, a second rod section and a third rod section which are connected in sequence, an outer diameter of the first rod section is greater than an outer diameter of the second rod section, and the outer diameter of the second rod section is greater than an outer diameter of the third rod section;

a bearing sleeved on the second rod section;

a bushing sleeved on the third rod section, wherein the bushing is welded to the third rod section, and two end surfaces of an inner ring of the bearing respectively abut against an end surface of the first rod section and an end surface of the bushing;

a valve head, wherein the valve head has an assembly cavity, and the bearing is located in the assembly cavity; and a pressing sleeve, wherein the pressing sleeve is arranged at an end of the valve head away from a sealing end; and an end of the pressing sleeve close to the sealing end abuts against the screw assembly to limit the screw assembly through the pressing sleeve;

wherein the screw, the bearing and the bushing form a screw assembly, and the valve head has the sealing end for blocking a valve port, wherein the pressing sleeve has a ring structure; and the pressing sleeve is in interference fit with or welded to the valve head.

10. A valve needle component, comprising:

a screw, wherein the screw comprises a first rod section, a second rod section and a third rod section which are connected in sequence, an outer diameter of the first rod section is greater than an outer diameter of the second rod section, and the outer diameter of the second rod section is greater than an outer diameter of the third rod section;

a bearing sleeved on the second rod section;

a bushing sleeved on the third rod section, wherein the bushing is welded to the third rod section, and two end surfaces of an inner ring of the bearing respectively abut against an end surface of the first rod section and an end surface of the bushing;

a valve head, wherein the valve head has an assembly cavity, and the bearing is located in the assembly cavity; and a pressing sleeve, wherein the pressing sleeve is arranged at an end of the valve head away from a sealing end; and an end of the pressing sleeve close to the sealing end abuts against the screw assembly to limit the screw assembly through the pressing sleeve;

wherein the screw, the bearing and the bushing form a screw assembly, and the valve head has the sealing end for blocking a valve port, wherein the assembly cavity comprises a first cavity section and a second cavity section; and along an extension direction of the valve head, a cross-sectional area of the second cavity section is greater than a cross-sectional area of the first cavity section to form a step surface between the first cavity section and the second cavity section, the pressing sleeve abuts against the step surface, and the step surface faces away from the sealing end.

11. The valve needle component as claimed in claim 10, wherein an accommodating channel is formed in the pressing sleeve; and along the extension direction of the valve head, a cross-sectional area of the accommodating channel is less than the cross-sectional area of the first cavity section to form a limiting surface for abutting against the screw assembly between the pressing sleeve and the first cavity section.

* * * * *